US009829323B2

(12) United States Patent
Hasegawa

(10) Patent No.: US 9,829,323 B2
(45) Date of Patent: Nov. 28, 2017

(54) APPARATUS, INFORMATION PROCESSING METHOD, AND INFORMATION PROCESSING SYSTEM

(71) Applicant: FUJITSU LIMITED, Kawasaki-shi, Kanagawa (JP)

(72) Inventor: Eiji Hasegawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 121 days.

(21) Appl. No.: 14/632,355

(22) Filed: Feb. 26, 2015

(65) Prior Publication Data

US 2015/0268049 A1 Sep. 24, 2015

(30) Foreign Application Priority Data

Mar. 20, 2014 (JP) ................................. 2014-059100

(51) Int. Cl.
*G06Q 10/08* (2012.01)
*G01C 21/20* (2006.01)
(52) U.S. Cl.
CPC ............. *G01C 21/20* (2013.01); *G06Q 10/08* (2013.01); *G06Q 10/087* (2013.01)
(58) Field of Classification Search
None
See application file for complete search history.

(56) References Cited

U.S. PATENT DOCUMENTS

| 7,378,968 | B2 * | 5/2008 | Wang | G01S 5/0018 340/539.13 |
| 7,667,573 | B2 * | 2/2010 | Ehrman | G06Q 10/08 340/10.1 |
| 8,195,122 | B1 * | 6/2012 | Kahn | H04W 48/16 455/404.2 |
| 8,510,238 | B1 * | 8/2013 | Aradhye | G06N 99/005 706/12 |
| 8,700,035 | B2 * | 4/2014 | Lee | H04M 1/7253 455/115.3 |
| 2006/0172736 | A1 * | 8/2006 | Nevo | H04W 48/18 455/435.1 |
| 2008/0167046 | A1 * | 7/2008 | Liao | H04W 36/32 455/441 |
| 2009/0040025 | A1 * | 2/2009 | Volpi | G01S 13/751 340/10.1 |

(Continued)

FOREIGN PATENT DOCUMENTS

| JP | 10-38993 | 2/1998 |
| JP | 2006-048443 | 2/2006 |

(Continued)

OTHER PUBLICATIONS

Salih et al. The Suitability of GPS Receivers Update Rates for Navigation Applications, International Journal of Mechanical, Aerospace, Industrial, Mechatronic and Manufacturing Engineering vol. 7, No. 6, 2013.*

(Continued)

*Primary Examiner* — Ryan Rink
(74) *Attorney, Agent, or Firm* — Oblon, McClelland, Maier & Neustadt, L.L.P.

(57) ABSTRACT

An apparatus includes a memory and a processor that is coupled to the memory. The processor is configured to obtain position information that indicates a position of the apparatus, calculate a movement amount of the apparatus based on the acquired position information, and execute a search for a device on an occasion where the calculated movement amount reaches a first value.

17 Claims, 19 Drawing Sheets

(56) References Cited

U.S. PATENT DOCUMENTS

| | | | | |
|---|---|---|---|---|
| 2009/0243855 | A1* | 10/2009 | Prokopuk | G01S 13/825 340/572.1 |
| 2009/0289845 | A1* | 11/2009 | Gum | G01S 19/26 342/357.31 |
| 2010/0304761 | A1* | 12/2010 | Seibert | H04W 52/0254 455/456.4 |
| 2011/0211563 | A1* | 9/2011 | Herrala | G01S 1/68 370/338 |
| 2012/0146786 | A1* | 6/2012 | Kindeberg | H04B 5/0062 340/539.13 |
| 2012/0264426 | A1* | 10/2012 | Kholaif | H04W 48/16 455/434 |
| 2014/0045481 | A1* | 2/2014 | Fraley | H04W 52/0258 455/418 |
| 2016/0142884 | A1* | 5/2016 | Sears | H04W 4/028 455/404.2 |
| 2016/0171203 | A1* | 6/2016 | Dean | G06F 21/35 726/19 |
| 2016/0212672 | A1* | 7/2016 | Fu | H04W 36/22 |

FOREIGN PATENT DOCUMENTS

| | | |
|---|---|---|
| JP | 2008-143658 | 6/2008 |
| JP | 2011-191135 | 9/2011 |

OTHER PUBLICATIONS

Office Action of Japanese Patent Application No. 2014-059100 dated Sep. 26, 2017 with Machine Generated English Translation, 8 pages.

\* cited by examiner

FIG. 10

| DEVICE INFORMATION | POSITION INFORMATION |
|---|---|
| (aa) | (X,Y) |

FIG. 14

| DEVICE INFORMATION | POSITION INFORMATION | FLAG |
|---|---|---|
| (aa) | (X,Y) | 1 |

APPARATUS, INFORMATION PROCESSING METHOD, AND INFORMATION PROCESSING SYSTEM

CROSS-REFERENCE TO RELATED APPLICATION

This application is based upon and claims the benefit of priority of the prior Japanese Patent Application No. 2014-059100, filed on Mar. 20, 2014, the entire contents of which are incorporated herein by reference.

FIELD

The embodiments discussed herein are related to an apparatus, an information processing method, and an information processing system.

BACKGROUND

In related art, a method of managing positions and a position management system have been suggested for portable devices such as laptop computers and projectors in an office, products in a product management warehouse, or articles or the like such as containers in an airport terminal (hereinafter referred to as device).

For example, radio frequency identification (RFID) tags are attached to the devices such as containers, and tag readers and positioning apparatuses are provided to moving bodies such as container transporting vehicles. The tag reader performs a search for the RF tag while the moving body is moving. When the tag reader detects the RF tag, device information that is recorded in the RF tag and position information of the moving body that is obtained by the positioning apparatus are associated together and stored. A method that manages the positions of the devices by such a method has been used. An example of a document of related art is Japanese Laid-open Patent Publication No. 2008-143658.

SUMMARY

According to an aspect of the invention, an apparatus includes a memory and a processor that is coupled to the memory. The processor is configured to obtain position information that indicates a position of the apparatus, calculate a movement amount of the apparatus based on the acquired position information, and execute a search for a device on an occasion where the calculated movement amount reaches a first value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10 illustrates information that is stored in a record unit in the first embodiment;

FIG. 14 illustrates information that is recorded in the record unit in the second embodiment;

DESCRIPTION OF EMBODIMENTS

Above-described Japanese Laid-open Patent Publication No. 2008-143658 does not disclose details of an operation of the tag reader that performs a search for the device and does not disclose a technology to reduce power consumption in the search operation that is performed by the tag reader.

It is desirable to provide a technology in which a device searching unit is installed in a mobile terminal apparatus and power that is consumed when the device searching unit searches for the device as a target of position management is reduced.

In a first embodiment, the mobile terminal apparatus performs a search for the device based on movement of the mobile terminal apparatus for a prescribed distance. Accordingly, the search for the device that is performed by the mobile terminal apparatus may be intermittently performed, and the power consumed by the mobile terminal apparatus may be reduced.

Referring to FIGS. 1 to 7, a description will be made about apparatus configurations and functions of the device, the mobile terminal apparatus, and an information processing apparatus such as a server that are used in the first embodiment. Referring to FIGS. 8 to 11, a description will be made about an information processing method of managing the position of the device.

Figure 1:
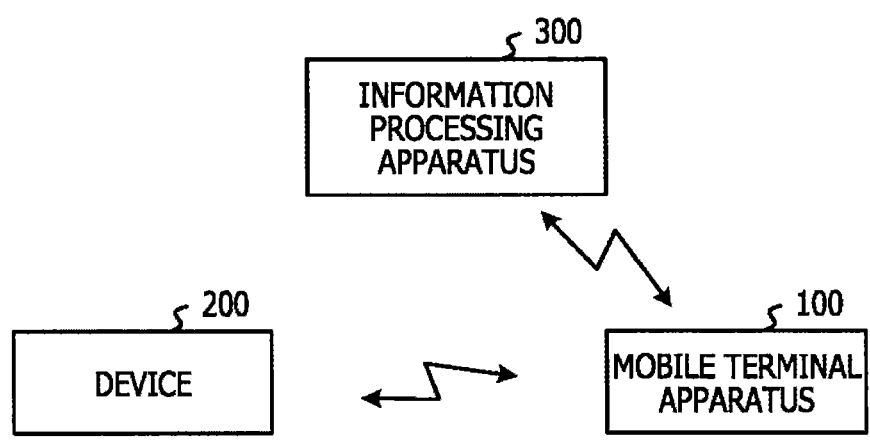
FIG. 1 illustrates a system configuration in a first embodiment.

FIG. 1 is a configuration diagram of a position information management system that is used in the first embodiment. A mobile terminal apparatus 100 is a portable terminal such as a smart phone, a laptop computer, a tablet computer, or the like, for example. A device 200 is a device that is a target of position management. A "device" herein means all articles whose positions are managed and is not limited to electronic devices. As described later, the device 200 has a function that is capable of notifying the mobile terminal apparatus 100 of the presence of the device 200 by using electromagnetic waves such as electric waves and magnetic fields. An information processing apparatus 300 is an information processing apparatus such as a cloud server and has a function of information communication with the mobile terminal apparatus 100.

The mobile terminal apparatus 100 is capable of moving by being carried by a person or by being arranged on a moving body such as a vehicle. The mobile terminal apparatus 100 executes a search for the device 200 by the electromagnetic wave such as the electric wave that is transmitted by the mobile terminal apparatus 100 and detects the presence of the device 200 in a case where the distance between the mobile terminal apparatus 100 and the device 200 is a prescribed value or smaller. The distance in which the mobile terminal apparatus 100 may detect the device 200 is determined by an intensity or the like of the electromagnetic wave that is transmitted by the mobile terminal apparatus 100. Further, the mobile terminal apparatus 100 has a unit to measure the position of the mobile terminal apparatus 100 and records the position information of the mobile terminal apparatus 100 together with device information about the detected device 200, for example, a device ID that identifies the device. Further, the mobile terminal apparatus 100 notifies the information processing apparatus 300 of the device information about the device 200 and the position information of the mobile terminal apparatus 100 as appropriate. The information processing apparatus 300 stores the information received from the mobile terminal apparatus 100 and manages the position of the device 200.

Figure 2:
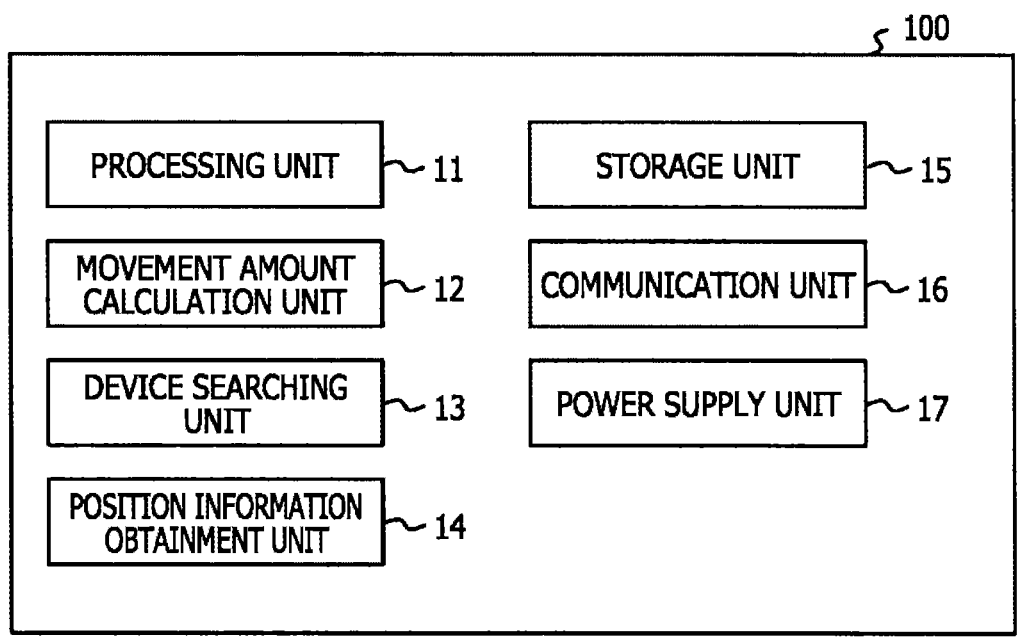
FIG. 2 illustrates function blocks of a mobile terminal apparatus in the first embodiment.

FIG. 2 is a function block diagram of the mobile terminal apparatus 100. The mobile terminal apparatus 100 has a processing unit 11, a movement amount calculation unit 12, a device searching unit 13, a position information obtainment unit 14, a storage unit 15, a communication unit 16, and a power supply unit 17. The processing unit 11 performs control of the other functions blocks. The movement amount calculation unit 12 calculates a movement amount (movement distance) of the mobile terminal apparatus 100 in a case where the mobile terminal apparatus 100 moves in accordance with the movement of the moving body such as the person or the vehicle that has the mobile terminal apparatus 100. The device searching unit 13 executes the search for the device 200 by transmitting an electromagnetic signal, detects the device 200 by receiving an electromagnetic signal from the device 200, and stores the device information of the device 200 in the storage unit 15. The position information obtainment unit 14 obtains the position information of the mobile terminal apparatus 100 itself and stores the obtained position information in the storage unit 15. The storage unit 15 stores prescribed programs in addition to recoding the device information and the position information. The communication unit 16 performs communication with the information processing apparatus 300 and notifies the information processing apparatus 300 of the device information and the position information that are recorded in the storage unit 15. The power supply unit 17 supplies power to each of the functions blocks.

Figure 3:
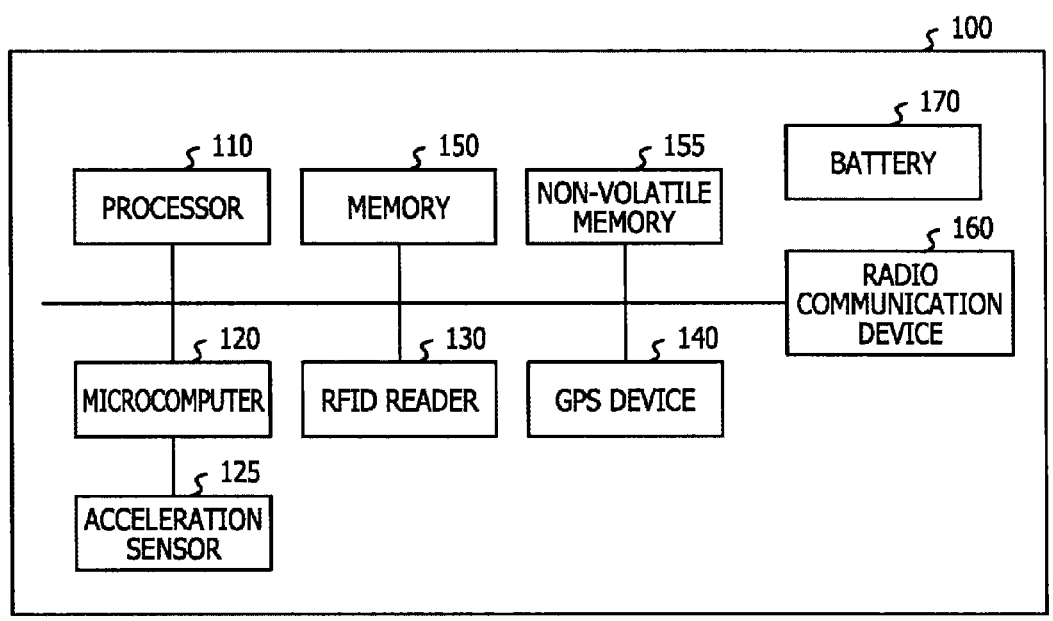
FIG. 3 illustrates a hardware configuration of the mobile terminal apparatus in the first embodiment.

FIG. 3 illustrates a hardware configuration of the mobile terminal apparatus 100. The mobile terminal apparatus 100 has a processor 110, a microcomputer 120, an acceleration sensor 125, an RFID reader 130, a Global Positioning System (GPS) device 140, a memory 150, a non-volatile memory 155, a radio communication device 160, and a battery 170. The processor 110 is an example of the processing unit 11 that is illustrated in FIG. 2 and executes prescribed programs to perform data processing about the information communication and the position management. The microcomputer 120 and the acceleration sensor 125 are examples of the movement amount calculation unit 12 that is illustrated in FIG. 2. The microcomputer 120 performs calculation of the movement distance of the mobile terminal apparatus 100 based on an acceleration of the mobile terminal apparatus 100 that is sensed by the acceleration sensor 125. A determination of whether or not the calculated distance reaches a prescribed value may be made by the microcomputer 120 or may be made by the processor 110. The RFID reader 130 is an example of the device searching unit 13 that is illustrated in FIG. 2 and transmits the electromagnetic wave such as the electric wave to perform a search and detection of the device that has an RF tag. The GPS device 140 is an example of the position information obtainment unit 14 that is illustrated in FIG. 2 and obtains the position information of the mobile terminal apparatus 100 based on signals from GPS satellites. The memory 150 and the non-volatile memory 155 are examples of the storage unit 15 that is illustrated in FIG. 2. The memory 150 may be used as a data storage area when the processor 110 performs data processing and stores the device information and the position information that are obtained by the RFID reader 130 and the GPS device 140. Further, the non-volatile memory 155 stores programs that are executed by the processor 110. The radio communication device 160 is an example of the communication unit 16 that is illustrated in FIG. 2. The battery 170 is an example of the power supply unit 17 that is illustrated in FIG. 2.

The processor 110 is an electronic circuit component such as a central processing unit (CPU), a micro processing unit (MPU), a digital signal processor (DSP), or a field programmable gate array (FPGA). Further, the memory 150 is an electronic circuit component such as a dynamic random access memory (DRAM), or a static random access memory (SRAM). Further, the non-volatile memory 155 is an electronic circuit component such as a read only memory (ROM) or a flash memory.

Figure 4:
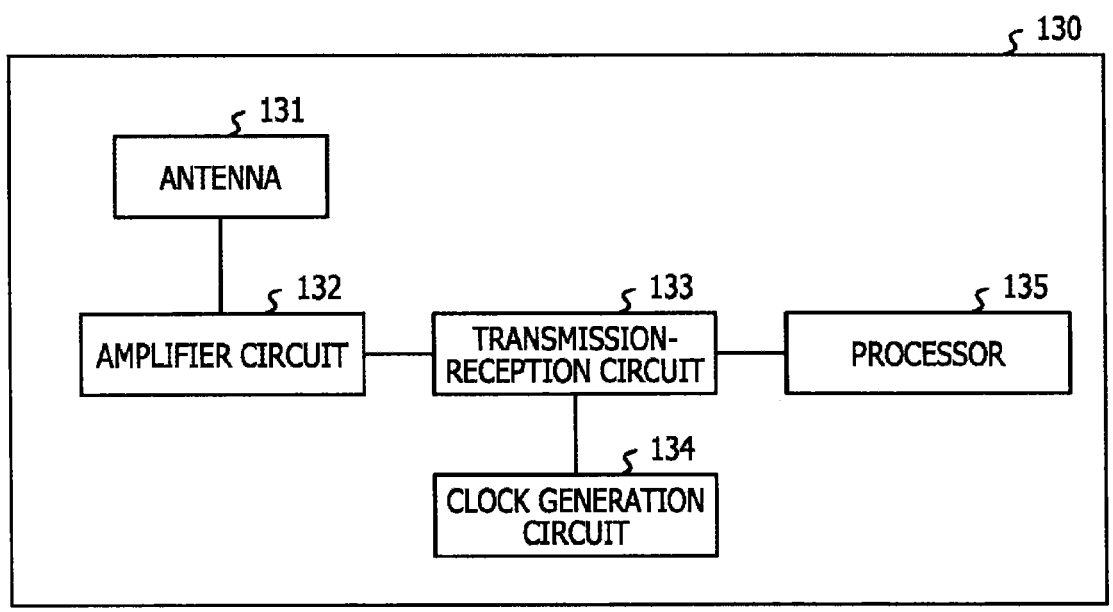
FIG. 4 illustrates a hardware configuration of an RFID reader in the first embodiment.

FIG. 4 illustrates a hardware configuration of the RFID reader 130. The RFID reader 130 has an antenna 131, an amplifier circuit 132, a transmission-reception circuit 133, a clock generation circuit 134, and a processor 135. The transmission-reception circuit 133 operates synchronously with a clock that is generated by the clock generation circuit 134 and generates signals that are desired for the search for the device 200 based on an instruction of the processor 135. The amplifier circuit 132 amplifies the signal received from the transmission-reception circuit 133 and transmits an electromagnetic wave signal from the antenna 131. Further, the antenna 131 receives the electromagnetic wave signal that is transmitted from the device 200 and passes the electromagnetic wave signal to the amplifier circuit 132. The amplifier circuit 132 amplifies the received signal and passes the signal to the transmission-reception circuit 133. A signal to which a process such as conversion into a digital signal is applied by the transmission-reception circuit 133 undergoes a data processing at the processor 135 and undergoes a recognition process about the device ID or the like of the device 200 that is a transmission source of the received signal.

Figure 5:
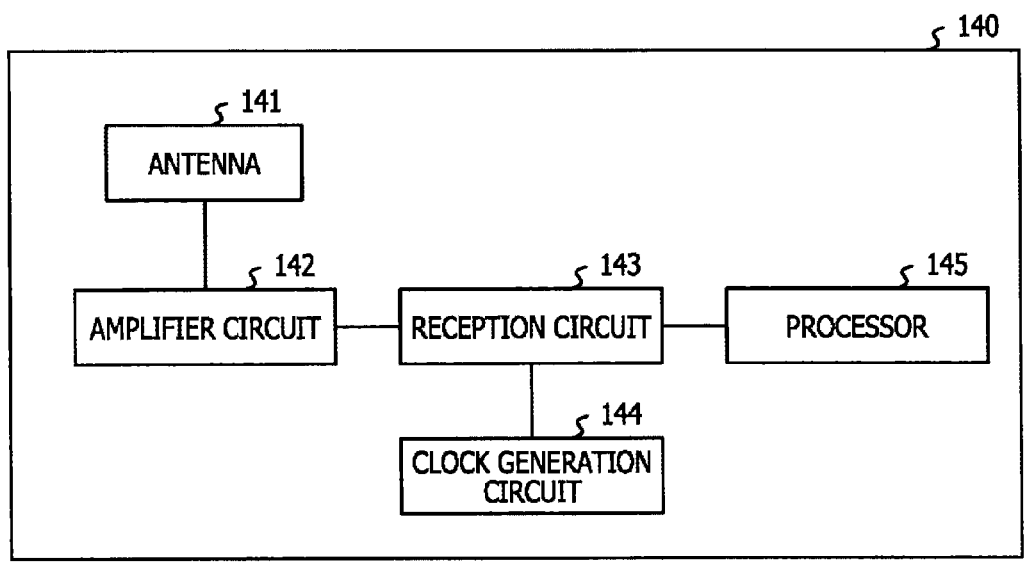
FIG. 5 illustrates a hardware configuration of a GPS device in the first embodiment.

FIG. 5 illustrates a hardware configuration of the GPS device 140. The GPS device 140 has an antenna 141, an amplifier circuit 142, a reception circuit 143, a clock generation circuit 144, and a processor 145. The antenna 141 receives electric wave signals about the position information from the GPS satellites and passes the electric wave signals to the amplifier circuit 142. The amplifier circuit 142 amplifies the signals received from the antenna 141. The reception circuit 143 performs a conversion process or the like of the amplified signals into digital signals. The processor 145 performs data processing based on the digital signals generated by the reception circuit 143 and recognizes the position of the mobile terminal apparatus 100.

Figure 6:
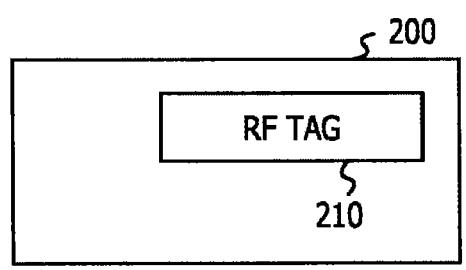
FIG. 6 illustrates a hardware configuration of a device in the first embodiment.

FIG. 6 illustrates a hardware configuration of the device 200. The device 200 has an RF tag 210. When the RF tag 210 receives the electromagnetic wave signal from the RFID reader 130, the RF tag 210 responds and sends the device information of the device 200 to which the RF tag 210 is attached to the RFID reader 130 by using an electromagnetic wave signal. The RF tag 210 may be of an electric wave type or an electromagnetic induction type. Further, the RF tag 210 itself may not have a power source or may have a power source.

Figure 7:
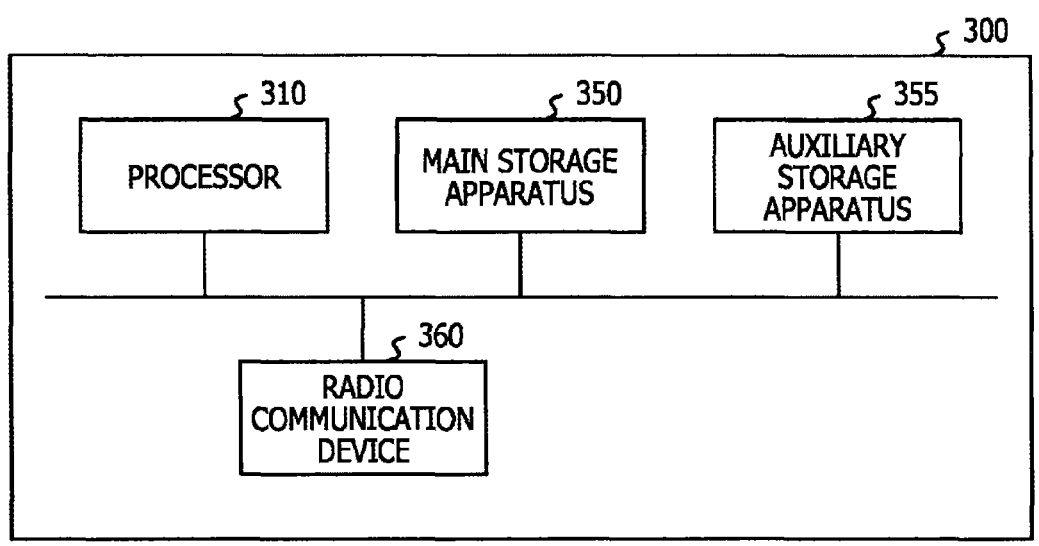
FIG. 7 illustrates a hardware configuration of an information processing apparatus in the first embodiment.

FIG. 7 illustrates a hardware configuration of the information processing apparatus 300. The information processing apparatus 300 includes a processor 310, a main storage apparatus 350, an auxiliary storage apparatus 355, and a radio communication device 360. The processor 310 performs control of whole the information processing apparatus 300, communication control, and information processing. The radio communication device 360 performs transmission and reception of data between the radio communication device 360 and the mobile terminal apparatus 100. The main storage apparatus 350 stores the device information and the position information that are received from the mobile terminal apparatus 100. The auxiliary storage apparatus 355 stores programs and so forth that are executed by the processor 310.

The processor 135, the processor 145, and the processor 310 that are illustrated in FIGS. 4, 5, and 7 are electronic circuit components such as the CPU, the MPU, the DSP, and the FPGA. Further, the main storage apparatus 350 is an electronic circuit component such as the DRAM or the SRAM. Further, the auxiliary storage apparatus 355 is a storage apparatus such as a hard disk drive (HDD).

Figure 8:
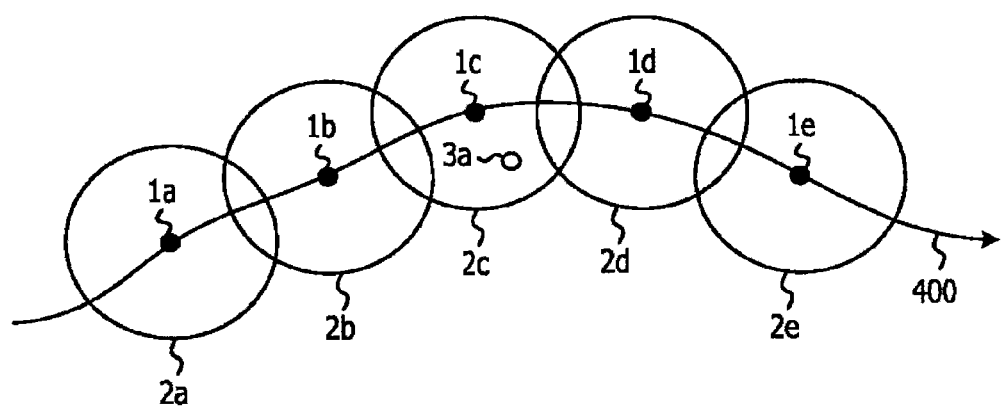
FIG. 8 explains the positional relationship among a movement locus and a search range of the mobile terminal apparatus and the device in the first embodiment.

FIG. 8 explains the relationship among a movement locus of the mobile terminal apparatus 100, a range in which the device 200 may be detected by the search performed by the mobile terminal apparatus 100, and a position of the device 200 in the first embodiment. A curve 400 represents the movement locus of the mobile terminal apparatus 100. Filled circle marks 1a, 1b, 1c, 1d, and 1e represent locations where the mobile terminal apparatus 100 that moves along the curve 400 executes the search for the device 200. Circles 2a, 2b, 2c, 2d, and 2e represent search ranges of the mobile terminal apparatus 100. Further, an open circle mark 3a represents the position of the device 200.

The mobile terminal apparatus 100 executes the search for the device 200 when the mobile terminal apparatus 100 itself moves for a prescribed distance. In a case where the mobile terminal apparatus 100 is in a distant position from the device 200 and the device 200 is not positioned in the search range, the device 200 is not detected by the search. However, the device 200 may be detected by the search that is performed in a state where the mobile terminal apparatus 100 is in the position of the filled circle mark 1c and the device 200 is present inside the circle 2c. A prescribed distance interval at which the mobile terminal apparatus 100 performs the search is set based on the diameter of each circle, that is, the range in which the mobile terminal apparatus 100 may detect the device 200. As described above, the mobile terminal apparatus 100 executes the search for the device at each time when the mobile terminal apparatus 100 moves for a certain distance, and power consumption for the search by the mobile terminal apparatus 100 may thereby be reduced. In addition, in a case where the device 200 is detected, the position information of the mobile terminal apparatus 100 is associated with the device information of the device 200, and the presence of the device 200 in the position of the mobile terminal apparatus 100 or in the vicinity thereof may thereby be recognized. This method enables avoidance of power consumption due to repetition of the search in a case the mobile terminal apparatus 100 stops in a distant position where the mobile terminal apparatus 100 may not detect the device 200, for example. This method is particularly useful as a method of managing the position of the device 200 while reducing power consumption in a circumstance where the device 200 itself does not move. However, this embodiment may be applied to a case where the position of the device 200 changes, for example, a case where a person different from the person who has the mobile terminal apparatus 100 moves the device 200 and may reduce power consumption of the mobile terminal apparatus 100.

Figure 9:
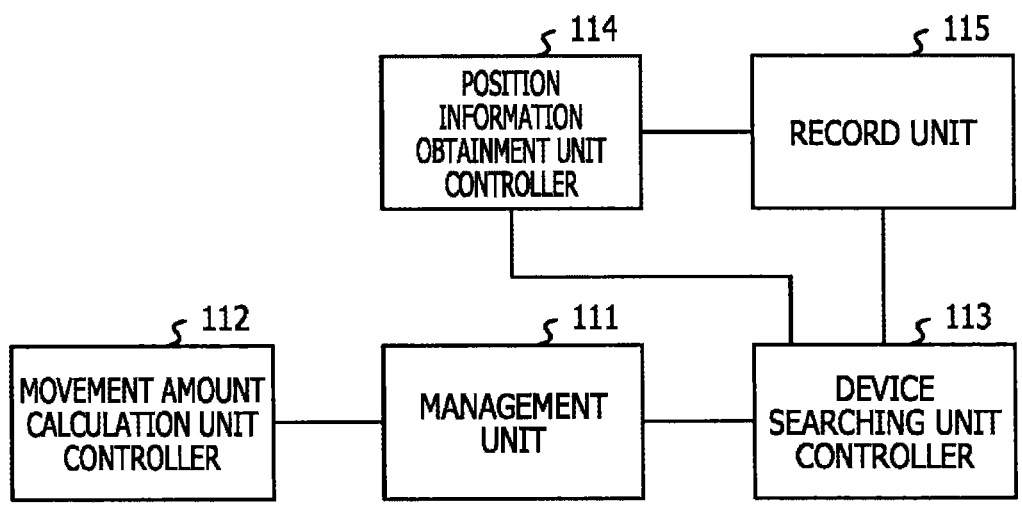
FIG. 9 illustrates function blocks of a processor that is provided to the mobile terminal apparatus in the first embodiment.

FIG. 9 illustrates function blocks of the processor 110 in the first embodiment. The processor 110 executes prescribed programs that are stored in another storage apparatus that is accessible from the non-volatile memory 155, the memory 150, or the processor 110 and realizes the functions illustrated in FIG. 9. The processor 110 functions as a management unit 111, a movement amount calculation unit controller 112, a device searching unit controller 113, a position information obtainment unit controller 114, and a record unit 115. The management unit 111 performs general control and management of the movement amount calculation unit controller 112, the device searching unit controller 113, the position information obtainment unit controller 114, and the record unit 115. The movement amount calculation unit controller 112 calculates the movement distance of the mobile terminal apparatus 100 by controlling the movement amount calculation unit 12. The movement amount calculation unit controller 112 performs a notification to the management unit 111 in a case where the movement distance of the mobile terminal apparatus 100 reaches a prescribed value. Here, the prescribed value of the movement distance is preferably set in accordance with the intensity of the electromagnetic wave that is transmitted for the search for the device 200. For example, the movement amount calculation unit 112 may change a setting of the prescribed value of the movement distance in accordance with an amplification factor of the amplifier circuit 132 that is illustrated in FIG. 4. The management unit 111 instructs the device searching unit controller 113 on execution of the search for the device 200 in a case where the movement distance of the mobile terminal apparatus 100 reaches the prescribed value. The device searching unit controller 113 performs the search for the device 200 by controlling the device searching unit 13. Further, in a case where the device 200 is detected by the search, the device searching unit controller 113 records information that identifies the detected device 200, for example, the device ID of the device 200 in the record unit 115. In addition, the device searching unit controller 113 notifies the position information obtainment unit controller 114 of the detection of the device 200. The position information obtainment unit controller 114 obtains the position information of the mobile terminal apparatus 100 by controlling the position information obtainment unit 14 and records the position information in the record unit 115.

The processor 110 does not have to realize all the functions that are illustrated in FIG. 9 and may allow another device to execute a portion of the functions. For example, the function as the movement amount calculation unit controller 112 may be executed by the microcomputer 120, and the function as the record unit 115 may be executed by the memory 150. In a case where the function as the movement amount calculation unit controller 112 is executed by the microcomputer 120, the microcomputer 120 detects a fact that the movement amount of the mobile terminal apparatus 100 reaches the prescribed value and notifies the processor 110 of the fact. Accordingly, an operation mode of the processor 110 is turned into a sleep mode while the movement amount of the mobile terminal apparatus 100 reaches the prescribed value, thereby enabling reduction in power consumption of the processor 110.

FIG. 10 illustrates an example of the device information and the position information that are stored in the record unit 115 in the first embodiment. In the example illustrated in FIG. 10, the device ID (for example, (aa)) provided to the device 200 that is detected by the device searching unit 13 is recorded as the device information, and the position information (for example, (X, Y)) that is obtained by the position information obtainment unit 14 is recorded as the position information. Those pieces of information enable recognition of the presence of the device 200 that has the device ID (aa) in a certain range from the position (X, Y).

Figure 11:
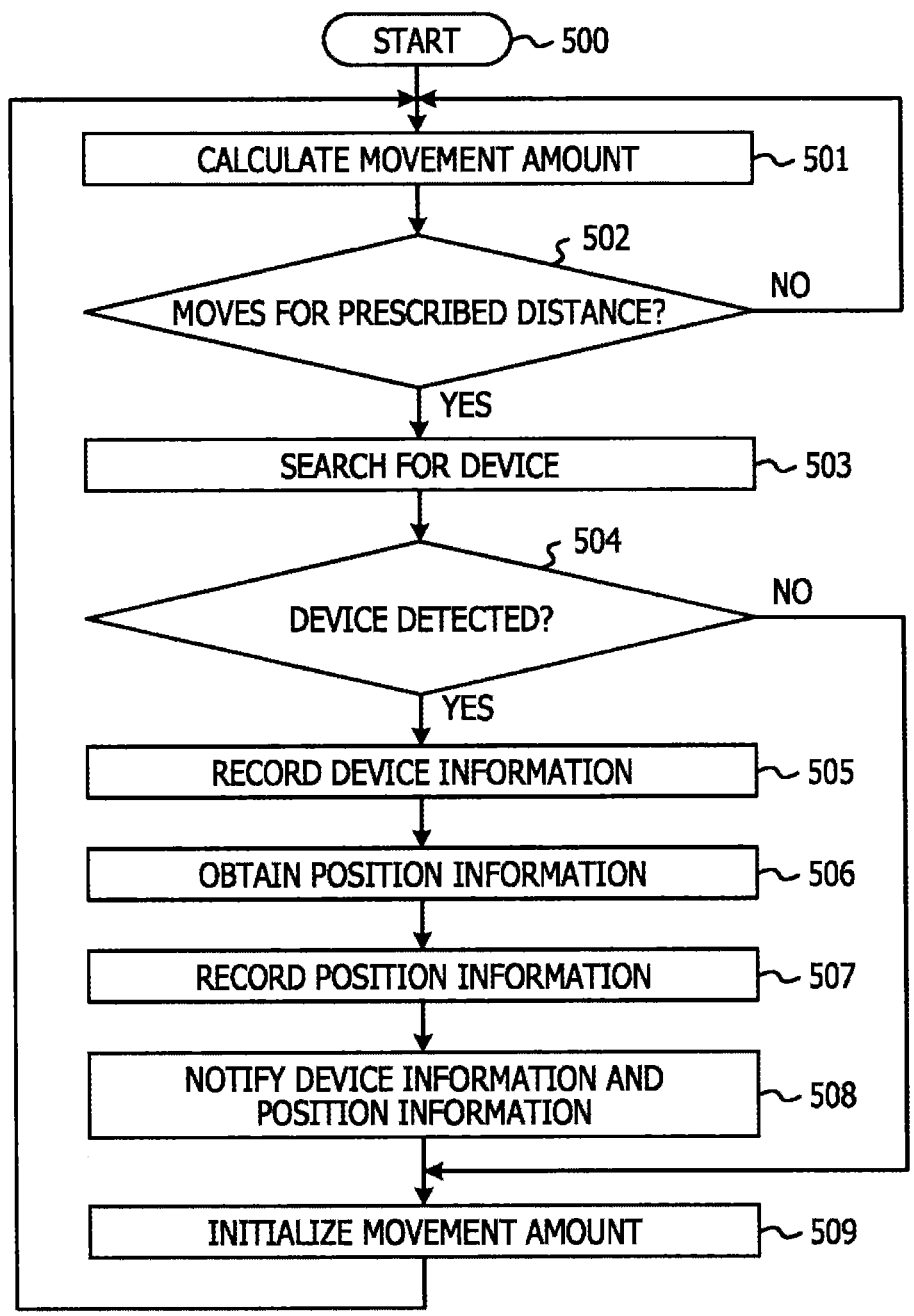
FIG. 11 is a processing flowchart of the processor that is provided to the mobile terminal apparatus in the first embodiment.

FIG. 11 is a processing flowchart of the processor 110 in the first embodiment. Processing by the processor 110 is started by a process 500. In a process 501, the movement amount calculation unit controller 112 calculates the movement amount of the mobile terminal apparatus 100. In a process 502, the movement amount calculation unit controller 112 determines whether or not the mobile terminal apparatus 100 moves for the prescribed distance based on the calculated movement amount. In a case where a determination is made that the mobile terminal apparatus 100 does not move for the prescribed distance in the process 502, the processing returns to the process 501. In a case where a determination is made that the mobile terminal apparatus 100 moves for the prescribed distance in the process 502, the processing progresses to the process 503. In the process 503, the device searching unit controller 113 executes the search for the device 200. In a process 504, the device searching unit controller 113 determines whether or not the device 200 is detected. In a case where a determination is made that the device 200 is detected in the process 504, the processing progresses to a process 505. In a case where a determination is made that the device 200 is not detected in the process 504, the processing progresses to a process 509. In the process 505, the record unit 115 records the device information of the device 200 that is detected by the device searching unit controller 113. In a process 506, the position information obtainment unit controller 114 obtains the position information of the mobile terminal apparatus 100. In a process 507, the record unit 115 records the position information of the mobile terminal apparatus 100 that is obtained by the position information obtainment unit controller 114. In a process 508, the management unit 111 instructs the communication unit 16 to notify the information processing apparatus 300 of the device information and the position information that are recorded in the record unit 115. The mobile terminal apparatus 100 itself may retain and manage the device information and the position information without notifying the information processing apparatus 300 of those pieces of information. In the process 509, the management unit 111 initializes the movement amount that is calculated by the movement amount calculation unit controller 112, and the processing returns to the process 501.

As described above, the mobile terminal apparatus 100 executes the search for the device 200, and the device information of the device 200 and the position information of the mobile terminal apparatus 100 are associated together and recorded in a case where the device 200 is detected, thereby enabling recognition of a substantial position of the device 200. Further, the mobile terminal apparatus 100 executes the search for the device 200 based on the movement of the mobile terminal apparatus 100 for the prescribed distance, and power consumption for a device search by the mobile terminal apparatus 100 may thus be reduced. In a case where the mobile terminal apparatus 100 operates based on power supply from the battery 170, an operation time of the mobile terminal apparatus 100 with the battery 170 may be increased.

In this embodiment, the position information obtainment unit 14 may obtain the position information on the detection of the device 200 or may execute an obtainment process of the position information regardless of the detection of the device 200. For example, in a case where the position information of the mobile terminal apparatus 100 has to be continuously obtained for another purpose that is different from the position management of the device 200, the obtainment process of the position information may be performed without establishing linkage with the detection of the device 200. In this case, the position information at a time of detection of the device 200 in the position information that is obtained for the other purpose is stored such that the position information at the time of detection corresponds to the device information, thereby enabling the position management of the device 200.

As a modification example of the first embodiment, the RF tag 210 itself that is attached to the device 200 may transmit a signal and may thereby notify the mobile terminal apparatus 100 of the presence of the RF tag 210. In this case, the mobile terminal apparatus 100 executes a detection process of the device 200 based on the movement of the mobile terminal apparatus 100 for the prescribed distance. For example, the device searching unit controller 113 illustrated in FIG. 9 does not perform transmission of the electromagnetic wave signal for searching for the device 200 but executes a process of detecting the device 200 by receiving the electromagnetic wave signal transmitted from the device 200 based on the movement of the mobile terminal apparatus 100 for the prescribed distance. As the process of receiving the electromagnetic wave signal to detect the device 200 is executed when the mobile terminal apparatus 100 moves for prescribed distance, the repeated execution of the detection process is reduced in a case where the mobile terminal apparatus 100 stops in a certain position, for example, and enables reduction in power consumption of the mobile terminal apparatus 100 for the detection. In this modification example, the prescribed distance is defined in accordance with the intensity of the electromagnetic wave that is transmitted by the RF tag 210 provided to the device 200.

A second embodiment will next be described. In the second embodiment, the apparatus configurations and functions illustrated in FIGS. 1 to 7 are used. While power consumption for obtainment of the position information by the mobile terminal apparatus 100 is reduced, movement of the device 200 in response to the mobile terminal apparatus 100 is recognized, and new position information is recorded. For example, it is assumed that position information collecting procedures described in the first embodiment is carried out in a state where a present position of the device 200 is already recorded in the mobile terminal apparatus 100 or the information processing apparatus 300. In the method of the first embodiment, when the person who retains the mobile terminal apparatus 100 passes through the vicinity of the device 200, the mobile terminal apparatus 100 detects the device 200, the position information of the mobile terminal apparatus 100 is obtained on the detection of the device 200, and the position information is recorded in the mobile terminal apparatus 100 or the information processing apparatus 300. However, the position information of the device 200 that is recorded in this case has the same content as the information that is already recorded in the mobile terminal apparatus 100 or the information processing apparatus 300 as the position information of the device 200. The second embodiment is for avoiding such a case where the same position information is obtained and recorded in a duplicated manner.

Specifically, in a case where a determination is made that the moving body such as the person or the vehicle that has the mobile terminal apparatus 100 simply passes through the vicinity of the device 200, the obtainment of the position information is not performed. In a case where a determination is made that the moving body moves while retaining or having the device 200 installed therein, that is, the moving body moves the device 200, information about a new position of the device 200 is obtained and recorded. This enables reduction in power consumption for position information obtainment in a case where the mobile terminal apparatus 100 simply passes through the vicinity of the device 200.

Figure 12:
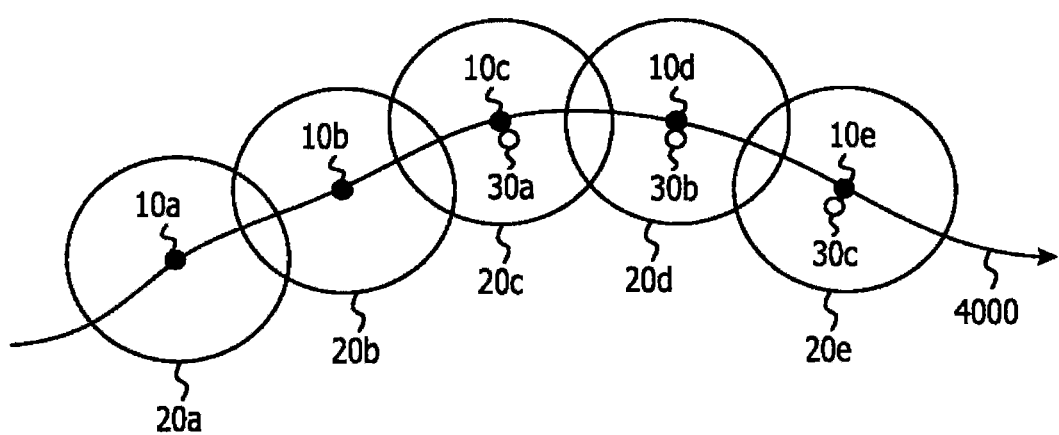
FIG. 12 explains the positional relationship among a movement locus and a search range of the mobile terminal apparatus and the device in the second embodiment.

FIG. 12 explains the positional relationship among a movement locus and a search range of the mobile terminal apparatus 100 and a position of the device 200 in the second embodiment. A curve 4000 represents the movement locus of the mobile terminal apparatus 100. Filled circle marks 10a, 10b, 10c, 10d, and 10e represent locations where the mobile terminal apparatus 100 that moves along the curve 4000 executes the search for the device 200. Circles 20a, 20b, 20c, 20d, and 20e represent search ranges of the mobile terminal apparatus 100. Further, an open circle mark 30a represents a position of the device 200. Further, the open circle marks 30b and 30c represent positions of the device 200 in a case where the device 200 positioned in the open circle mark 30a moves in response to the movement of the mobile terminal apparatus 100. For example, in cases where a worker who retains the mobile terminal apparatus 100 moves the device 200 while retaining the device 200, where a vehicle in which the mobile terminal apparatus 100 is installed moves to another location while carrying the device 200, and so forth, the mobile terminal apparatus 100 and the device 200 together draw similar movement loci as represented by the filled circle mark 10c with the open circle mark 30a, 10d with 30b, and 10e with 30c in FIG. 12. That is, in a case where the person or the moving body that has the mobile terminal apparatus 100 moves the device 200, the same device 200 is repeatedly detected for plural times in the device search that is performed at each time when the mobile terminal apparatus 100 moves for the prescribed distance. In other words, in a case where the same device 200 is repeatedly detected in the plural times of searches, a determination is made that the moving body such as the person or the vehicle that has the mobile terminal apparatus 100 moves the device 200. In a case where the device 200 is detected with a prescribed frequency or lower, for example, only once, a determination may be made that the moving body such as the person or the vehicle that has the mobile terminal apparatus 100 simply passes though the vicinity of the device 200. The prescribed frequency in this case is once.

Based on such a concept, in the second embodiment, in a case where the same device 200 is repeatedly detected with the prescribed frequency in the plural times of searches, it is recognized that the moving body such as the person or the vehicle that has the mobile terminal apparatus 100 is carrying the device 200, and the position information is updated. Further, even if the device 200 is detected in one time of search, the position information is not obtained at that time. This enables reduction in power consumption for the obtainment of the position information.

Figure 13:
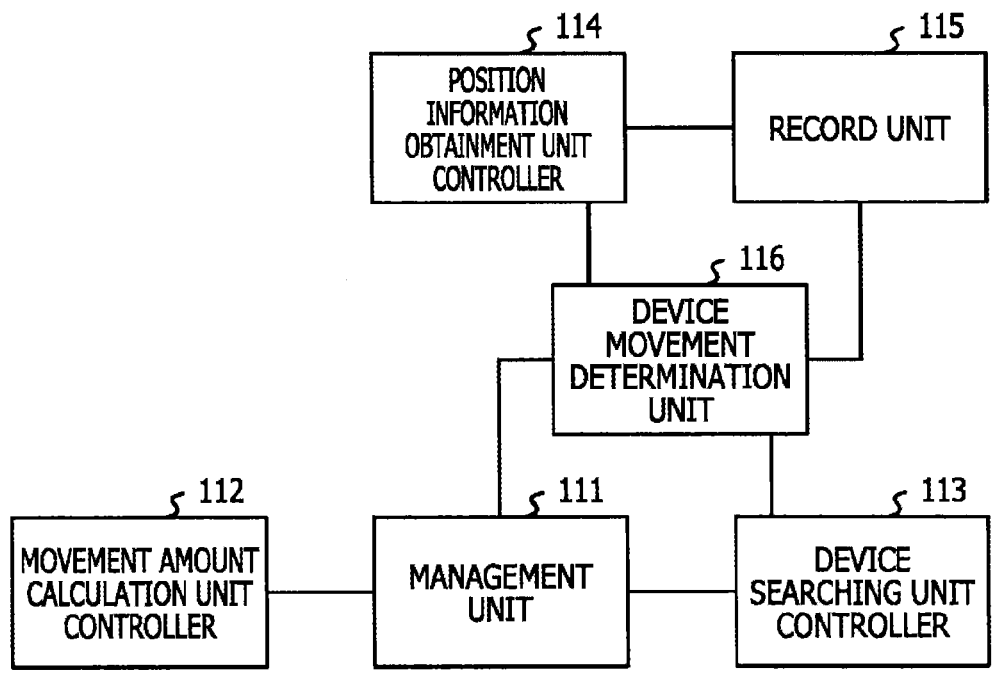
FIG. 13 illustrates function blocks of the processor that is provided to the mobile terminal apparatus in the second embodiment.

FIG. 13 illustrates function blocks of the processor 110 in the second embodiment. The processor 110 further functions as a device movement determination unit 116 in addition to the management unit 111, the movement amount calculation unit controller 112, the device searching unit controller 113, the position information obtainment unit controller 114, and the record unit 115 that are disclosed in the first embodiment. The device movement determination unit 116 has a function of determining whether or not the same device 200 is repeatedly detected with the prescribed frequency by the device searching unit controller 113. A specific value of the prescribed frequency is not limited, but a description will be made here with a case where the prescribed frequency is "twice". Details of the management unit 111, the movement amount calculation unit controller 112, the device searching unit controller 113, the position information obtainment unit controller 114, and the record unit 115 are described in the first embodiment. Here, the function of the device movement determination unit 116 will mainly be described.

The device movement determination unit 116 obtains the device information that is detected by the device searching unit controller 113, generates a flag that indicates that the device 200 is detected, and records the flag with the device information in the record unit 115. Then, in a case where the device 200 is detected in the search that is next executed, the device movement determination unit 116 determines whether or not the flag is stored in the record unit 115 and whether or not the device 200 is the device that has the same device information as the device 200 that is detected in the previous search. In a case where a determination is made that the flag is stored in the record unit 115 and the device information of the device 200 that is detected at the present search is the same as the device information that is recorded in the record unit 115, the device movement determination unit 116 instructs the position information obtainment unit controller 114 to obtain the position information. The position information that is obtained by the position information obtainment unit controller 114 is recorded in the record unit 115 and notified to the information processing apparatus 300 as appropriate. Further, in a case where the flag is not stored in the record unit 115 or where the device information of the device 200 that is detected at the present search is not the same as the device information that is recorded in the record unit 115, the device movement determination unit 116 does not instruct the position information obtainment unit controller 114 to obtain the position information. This enables reduction in power consumption for the obtainment of the position information.

FIG. 14 illustrates information that is recorded in the record unit 115. The device information, the position information, and the flag are associated together and recorded. An example illustrated in FIG. 14 indicates that the device 200 that has the device ID (aa) is detected in the previous search and (X, Y) is together recorded as the position information. Further, FIG. 14 indicates that "1" is recorded as the flag.

Figure 15:
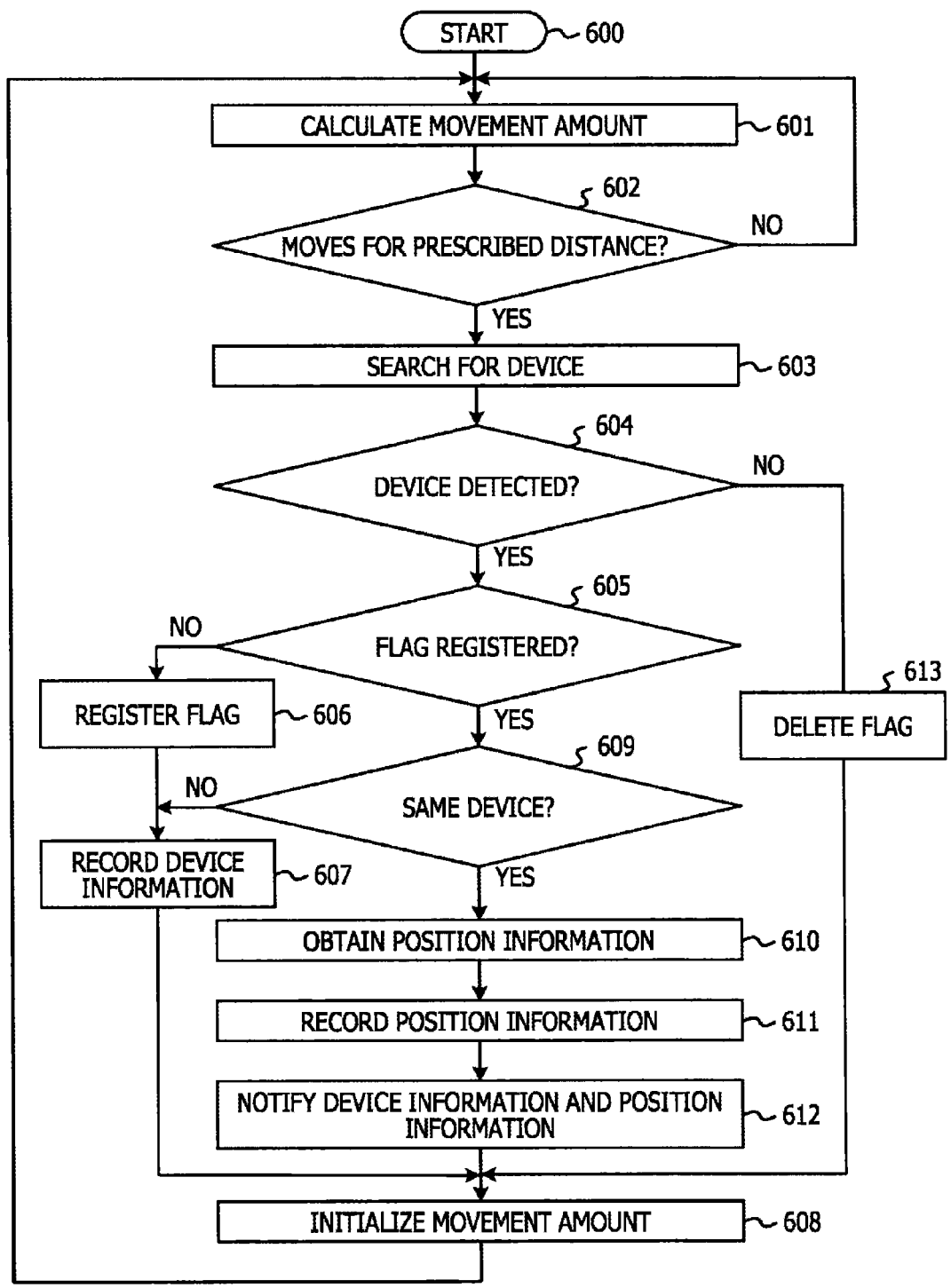
FIG. 15 is a processing flowchart of the processor that is provided to the mobile terminal apparatus in the second embodiment.

FIG. 15 is a processing flowchart of the processor 110 in the second embodiment. Along this processing flowchart, descriptions will sequentially be made first about a processing flow in a case where the device 200 is detected, next about a processing flow in a case where the device 200 is repeatedly detected, and finally about a case where the device 200 is not detected.

Processing by the processor 110 is started by a process 600. In a process 601, the movement amount calculation unit controller 112 calculates the movement amount of the mobile terminal apparatus 100. In a process 602, the movement amount calculation unit controller 112 determines whether or not the mobile terminal apparatus 100 moves for the prescribed distance based on the calculated movement amount. In a case where a determination is made that the mobile terminal apparatus 100 does not move for the prescribed distance in the process 602, the processing returns to the process 601. In a case where a determination is made that the mobile terminal apparatus 100 moves for the prescribed distance, the processing progresses to a process 603. In the process 603, the device searching unit controller 113 executes the search for the device 200. In a process 604, the device searching unit controller 113 determines whether or not the device 200 is detected. In a case where a determination is made that the device 200 is detected in the process 604, the processing progresses to a process 605. In a case where a determination is made that the device 200 is not detected, the processing progresses to a process 613.

In the process 605, the device movement determination unit 116 determines whether or not the flag is registered in the record unit 115. In a case where a determination is made that the flag is not registered in the process 605, the processing progresses to a process 606. In a case where a determination is made that the flag is registered, the processing progresses to a process 609. In the process 606, the record unit 115 registers the flag. In a process 607, the record unit 115 records the device information of the detected device 200. In a process 608, the management unit 111 initializes the movement amount that is calculated by the movement amount calculation unit controller 112, and the processing returns to the process 601. In the above, a description is made about processing in which first detection of the device 200 is performed by the processes 601, 602, 603, 604, 605, 606, 607, and 608.

In a case where the processing returns to the process 601 and subsequently progresses to the process 604 again and the device 200 is detected, in the process 605, the device movement determination unit 116 determines whether or not the flag is registered in the record unit 115. In a case where a determination is made that the flag is registered, the processing progresses to the process 609. In the process 609, the device movement determination unit 116 determines whether or not the device information of the device 200 that is detected by the device searching unit controller 113 agrees with the device information that is recorded in the record unit 115. In a case where the two pieces of device information agree with each other, that is, the device 200 that is detected in the previous search is the same as the device 200 that is detected in the present search, the processing progresses to a process 610. In a case where the device 200 is not the same, the processing progresses to the process 607. In the process 610, the position information obtainment unit controller 114 obtains the position information of the mobile terminal apparatus 100. In a process 611, the record unit 115 records the position information of the mobile terminal apparatus 100 that is obtained by the position information obtainment unit controller 114. In a process 612, the management unit 111 instructs the communication unit 16 to notify the information processing apparatus 300 of the device information and the position information that are recorded in the record unit 115 as appropriate. In the subsequent process 608, the management unit 111 initializes the movement amount that is calculated by the movement amount calculation unit controller 112, and the processing returns to the process 601. In the above, a description is made about processing in a case where repeated detection of the same device 200 is performed in two times of searches by the processes 601, 602, 603, 604, 605, 609, 610, 611, 612, and 608.

The processing returns to the process 601 and subsequently progresses to the process 604 again. In a case where a determination is made that the device 200 is not detected in the process 604, the device movement determination unit 116 deletes the flag that is registered in the record unit 115 in the process 613. The processing again returns to the process 601 via the process 608.

As described above, in the second embodiment, in the search that is repeatedly performed based on the movement of the mobile terminal apparatus 100 for a certain distance, the position information of the mobile terminal apparatus 100 is not obtained at the time when the device 200 is detected once. However, in a case where the same device 200 is repeatedly detected with the prescribed frequency, the position information of the mobile terminal apparatus 100 is obtained. This method enables obtainment of new position information only in a case where the device 200 moves and thus enables reduction in power consumption for the obtainment process of the position information by the mobile terminal apparatus 100.

Further, as a modification example of the second embodiment, a change may be made such that the intensity of the electromagnetic wave during the search for the device 200 is lowered in a case where the same device is repeatedly detected with the prescribed frequency. In a case where the same device is repeatedly detected with the prescribed frequency, a determination may be made that the moving body such as the person or the vehicle that has the mobile terminal apparatus 100 is moving in a state where the moving body retains or has the device 200 installed therein, and it may thus be expected that the mobile terminal apparatus 100 and the device 200 subsequently maintain a close positional relationship. Accordingly, it may be considered that the detection of the device 200 may successively be performed even if the intensity of the electromagnetic wave during the search is lowered.

Further, as another modification example, the distance interval at which the search for the device 200 is performed may be changed in a case where the same device is repeatedly detected with the prescribed frequency. For example, a setting may be changed such that the prescribed distance interval is made shorter after the same device is repeatedly detected with the prescribed frequency. Such a change of the setting is performed, and the movement locus of the device 200 may thereby be more specifically recorded. Alternatively, a change of the setting may be made such that the prescribed distance interval is made longer in order to reduce power consumption of the mobile terminal apparatus 100. In this case also, the mobile terminal apparatus 100 does not lose the device 200 as long as a close distance interval is maintained between the mobile terminal apparatus 100 and the device 200, and the position information may keep being updated.

The position management methods described in the first embodiment and a position management method described in the second embodiment may be carried out in an appropriate combination. For example, the position of the device 200 may first be recognized by the method described in the first embodiment. New position information may thereafter be registered by the method described in the second embodiment only in a case where the position of the device 200 is changed.

A third embodiment will next be described. In the third embodiment, the apparatus configurations and functions illustrated in FIGS. 1 to 7 are used. While power consumption for the detection of the device by the mobile terminal apparatus 100 is further reduced, movement of the device 200 in response to the movement of the mobile terminal apparatus 100 is recognized, and new position information is recorded.

The third embodiment is made on an assumption that when the moving body such as the person or the vehicle that has the mobile terminal apparatus 100 moves the device 200, the moving body once stops in the position where the device 200 is present in order to make the person retain the device 200 or to install the device 200 in the moving body. In other words, the third embodiment is based on a concept that even if the device 200 is detected while the mobile terminal apparatus 100 is successively moving, the detection is made because the mobile terminal apparatus 100 simply passes through the vicinity of the device 200, and the device 200 does not move. On such an assumption, the search for the device 200 that is described in the second embodiment is executed on a transition of the state of the mobile terminal apparatus 100 from a stop state to a moving state. Then, in a case where the same device 200 is repeatedly detected with the prescribed frequency, the device information and the position information are recorded. On the other hand, in a case where the device 200 is not detected in the search, the device searching unit 13 becomes a deactivated state, and the search for the device 200 is not executed even if the mobile terminal apparatus 100 moves for the prescribed distance. When the mobile terminal apparatus 100 stops once and the state of the mobile terminal apparatus 100 transits from the stop state to the moving state, the device searching unit 13 is again activated. Such control is performed, and power consumption of the mobile terminal apparatus 100 is thereby reduced without executing the search for the device 200 in a case where the moving body such as the person or the vehicle that has the mobile terminal apparatus 100 is simply moving while not retaining or having the device 200 installed therein.

Figure 16:
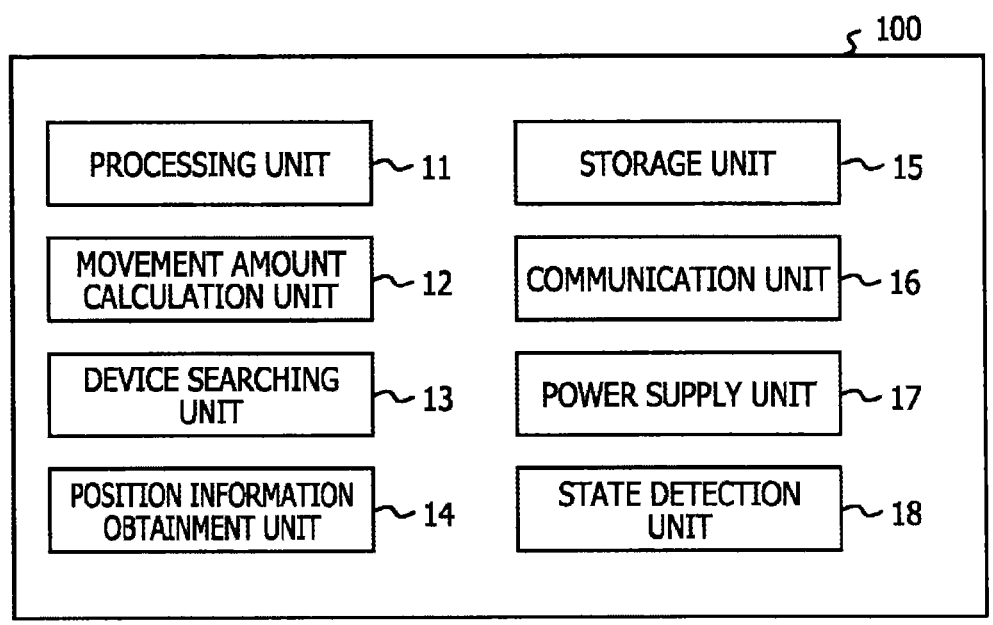
FIG. 16 illustrates function blocks of the mobile terminal apparatus in a third embodiment.

FIG. 16 illustrates function blocks of the mobile terminal apparatus 100 in the third embodiment. The mobile terminal apparatus 100 further has a state detection unit 18 in addition to the functions illustrated in FIG. 2. The state detection unit 18 detects whether the mobile terminal apparatus 100 is in the stop state or the moving state. For example, the state detection unit 18 may be realized by the microcomputer 120 and the acceleration sensor 125 that are illustrated in FIG. 3. Further, the state detection unit 18 may be realized by combining a gyro sensor or the like with the microcomputer 120 and the acceleration sensor 125.

Figure 17:
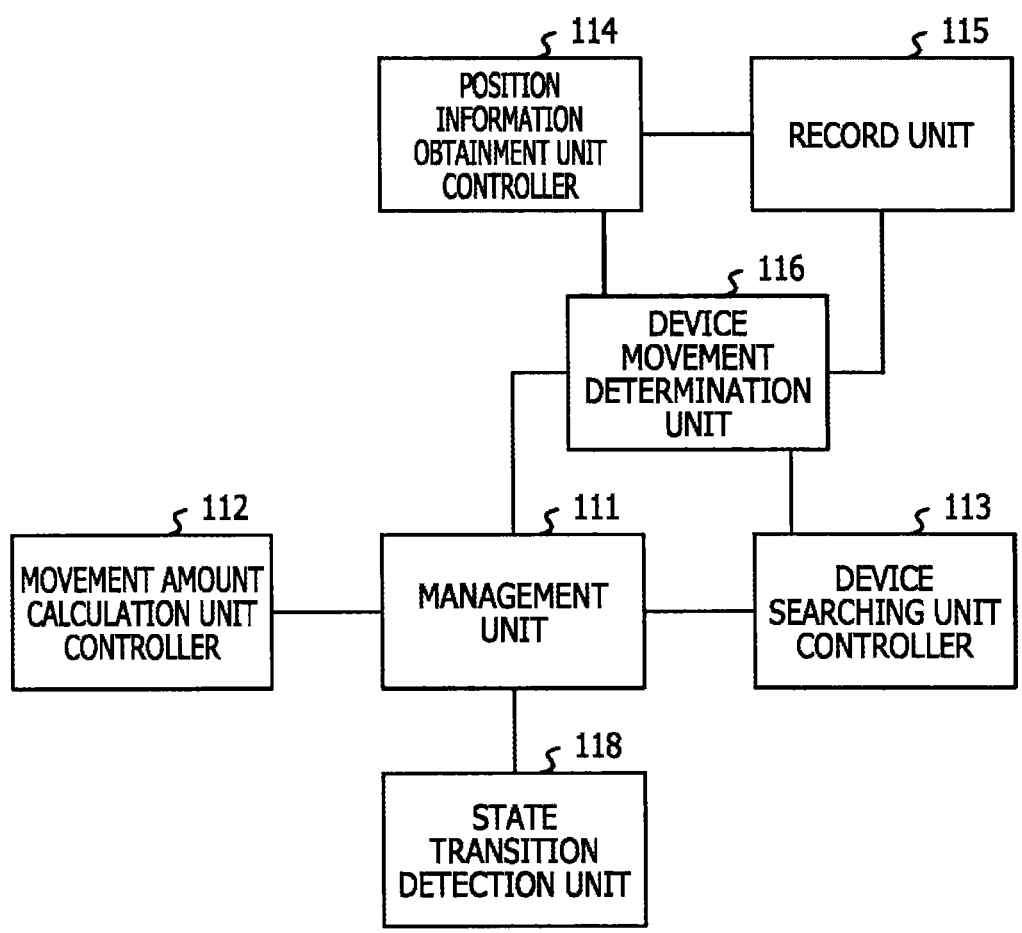
FIG. 17 illustrates function blocks of the processor that is provided to the mobile terminal apparatus in the third embodiment.

FIG. 17 illustrates function blocks of the processor 110 in the third embodiment. The processor 110 further has a state transition detection unit 118 in addition to the functions illustrated in FIG. 13. The state transition detection unit 118 has a function of notifying the management unit 111 that the state of the mobile terminal apparatus 100 that is detected by using the state detection unit 18 transits from the stop state to the moving state. When the management unit 111 receives a notification from the state transition detection unit 118, the management unit 111 instructs the device searching unit controller 113 to activate a searching function of the device searching unit 13 for the device 200. In a case where the device 200 is not detected in the executed search, the management unit 111 instructs the device searching unit controller 113 to deactivate the searching function of the device searching unit 13. The deactivation of the device searching unit 13 described here means not executing the search for the device 200 even if the mobile terminal apparatus 100 moves for the prescribed distance and includes a method of stopping power supply to the device searching unit 13, a method in which power supply to the device searching unit 13 is performed but the management unit 111 does not instruct the device searching unit controller 113 to perform the search even if the mobile terminal apparatus 100 moves for the prescribed distance, a method of stopping the process of the movement amount calculation by the movement amount calculation unit controller 112, and so forth, for example.

Figure 18:
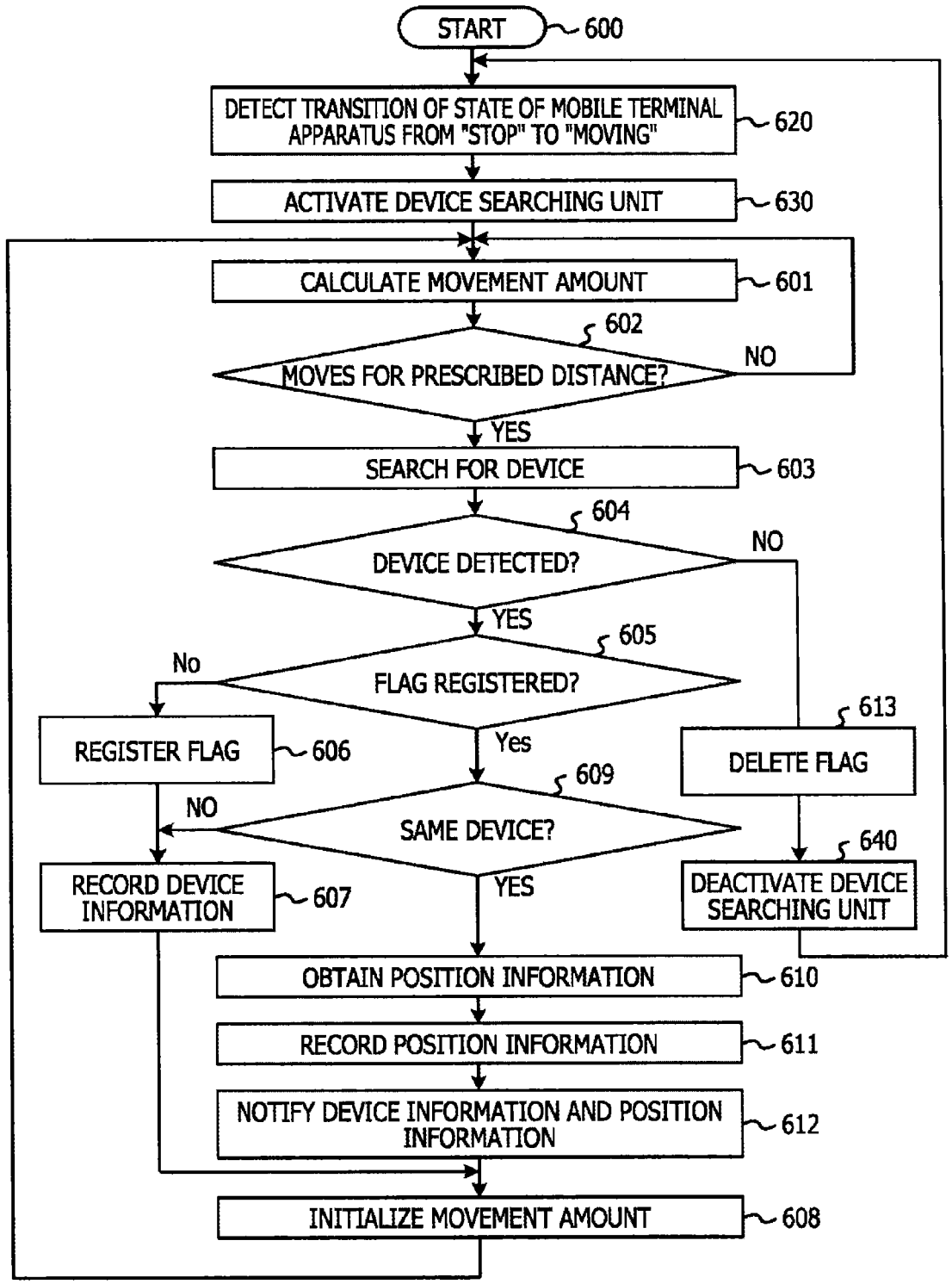
FIG. 18 is a processing flowchart of the processor that is provided to the mobile terminal apparatus in the third embodiment.

FIG. 18 is a processing flowchart of the processor 110 in the third embodiment. Here, a description will be made about an example where an operation of the device searching unit 13 is deactivated in a case where the device 200 is not detected and the operation of the device searching unit 13 is activated on the transition of the state of the mobile terminal apparatus 100 from the stop state to the moving state. The same reference numerals are provided to processes of the same contents as the processes illustrated in FIG. 15, and a description thereof will not be made.

After the processing is started by the process 600, the state transition detection unit 118 detects that the state of the mobile terminal apparatus 100 transits from the stop state to the moving state in a process 620. In a process 630, the management unit 111 activates a state of the device searching unit 13. Accordingly, the search for the device 200 is executed based on the movement of the mobile terminal apparatus 100 for the prescribed distance in the processes 601, 602, and 603.

Further, in a case where a determination is made that the device 200 is not detected in the process 604, the processing progresses to the process 613. The record unit 115 deletes the flag in the process 613, and the management unit 111 deactivates the device searching unit 13 in a process 640. Accordingly, a search process for the device 200 is not executed even if the mobile terminal apparatus 100 moves for the prescribed distance. The processing thereafter returns to the process 620. In a case where the state of the mobile terminal apparatus 100 again changes from the stop state to the moving state, the device searching unit 13 is activated.

As described above, in a case where the mobile terminal apparatus 100 does not detect the device 200, the subsequent search for the device 200 is not performed, the mobile terminal apparatus 100 is stopped, and the search for the device 200 is resumed on a start of subsequent movement. Accordingly, power consumption of the mobile terminal apparatus 100 may be reduced while movement of the device 200 that is caused by the moving body such as the person or the vehicle that has the mobile terminal apparatus 100 is detected and the position information is updated.

FIG. 18 exemplifies a method of deactivating the device searching unit 13 in a case where the device 200 is not detected. However, a modification example is possible where a calculation process of the movement distance by the movement amount calculation unit 12 is terminated. In this case, power consumption for processes by the movement amount calculation unit 12 and the device searching unit 13 may be reduced. Further, in this modification example, the calculated movement distance may be initialized when the movement amount calculation unit 12 is deactivated. In this case, the first search is performed at the time when the state of the mobile terminal apparatus 100 transits from the stop state to the moving state, and the next search may thereafter be performed when the mobile terminal apparatus 100 moves for a certain distance.

A fourth embodiment will next be described. In the fourth embodiment, the apparatus configurations and functions illustrated in FIGS. 1 to 7 are used. In a case where a determination may be made that the moving body such as the person or the vehicle that has the mobile terminal apparatus 100 is moving while retaining or having the device 200 installed therein, the search for the device 200 is stopped, thereby further reducing power consumption for the search. A concept of the fourth embodiment will first be described.

In a case where the moving body such as the person or the vehicle that has the mobile terminal apparatus 100 is moving while retaining or having the device 200 installed therein, it may be considered that the device 200 is continuously present in the vicinity of the mobile terminal apparatus 100. Thus, it may be considered that the presence of the device 200 does not have to be confirmed by repeatedly performing the search for the device 200. In other words, as described in the second and third embodiments, in a case where the same device 200 is repeatedly detected for plural times, it may be considered that the device searching unit 13 may thereafter be deactivated. Further, it may be considered that the moving body such as the person or the vehicle that has the mobile terminal apparatus 100 stops once in a case the retained or installed device 200 is put down and the position is fixed. Thus, it may be considered that the device searching unit 13 may stop the search for the device 200 until the mobile terminal apparatus 100 stops.

The fourth embodiment is based on such a concept. The device searching unit 13 is deactivated and does not perform the search for the device 200 while the mobile terminal apparatus 100 keeps moving after the same device 200 is repeatedly detected with the prescribed frequency. However, even in this case, the movement amount calculation by the movement amount calculation unit 12 is successively executed, and the position information of the mobile terminal apparatus 100 is recorded based on the movement of the mobile terminal apparatus 100 for the prescribed distance. This enables recognition of how the device 200 moves in response to the mobile terminal apparatus 100.

In the fourth embodiment, the mobile terminal apparatus 100 has similar functions to the function blocks illustrated in FIG. 16. The processor 110 realizes similar functions to the function blocks illustrated in FIG. 17.

Figure 19:
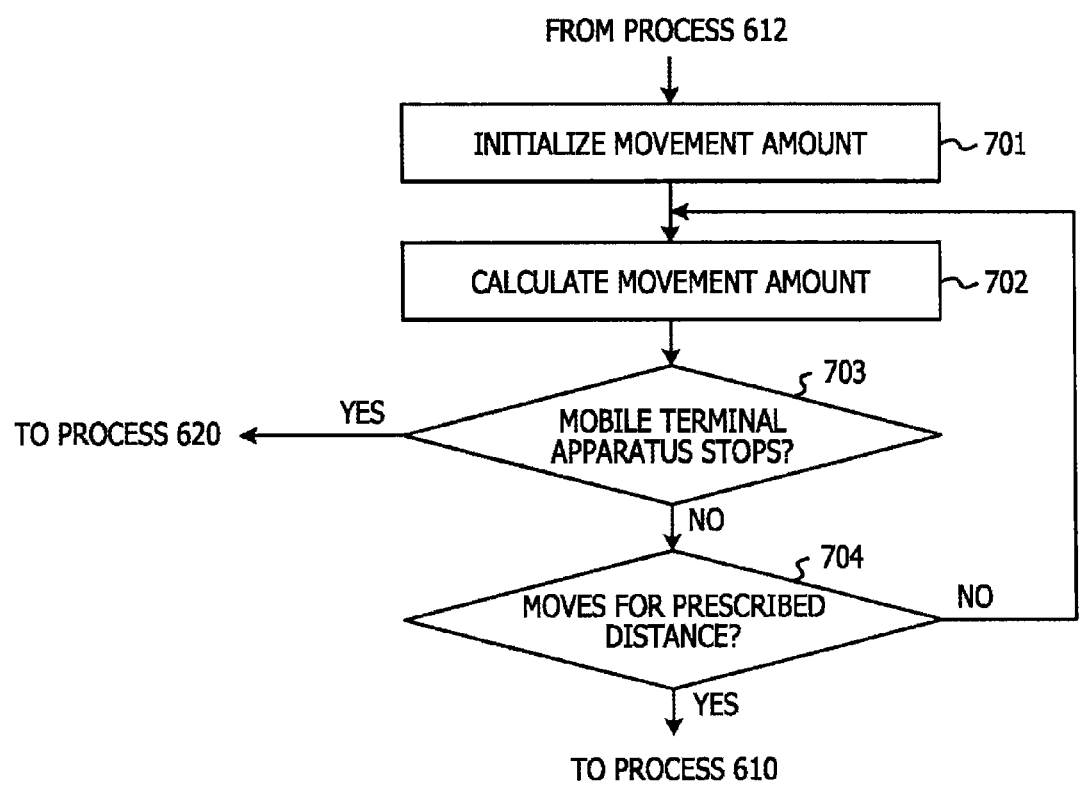
FIG. 19 is a processing flowchart of the processor that is provided to the mobile terminal apparatus in a fourth embodiment.

FIG. 19 is a processing flowchart of the processor 110 in the fourth embodiment. The processing by the processor 110 in the fourth embodiment is based on the processing that is described in the third embodiment, to a portion of which new processes are added. Thus, FIG. 19 illustrates only processes that are added to FIG. 18 and extracted from the whole processing.

In the fourth embodiment, after the process 612 illustrated in FIG. 18, the processing does not move to the process 608 but to a process 701. In the process 701, the movement amount calculation unit controller 112 initializes the calculated movement amount. In a process 702, the movement amount calculation unit controller 112 calculates the movement amount of the mobile terminal apparatus 100. In a process 703, the state transition detection unit 118 determines whether or not the mobile terminal apparatus 100 stops. In a case where a determination is made that the mobile terminal apparatus 100 stops in the process 703, the processing returns to the process 620. In a case where a determination is made that the mobile terminal apparatus 100 does not stop, the processing progresses to a process 704. In the process 704, the movement amount calculation unit controller 112 determines whether or not the mobile terminal apparatus 100 moves for the prescribed distance based on the calculated movement amount. In a case where a determination is made that the mobile terminal apparatus 100 moves for the prescribed distance in the process 704, the processing returns to the process 610. In a case where a determination is made that the mobile terminal apparatus 100 does not move for the prescribed distance, the processing returns to the process 702. That is, the position information of the mobile terminal apparatus 100 keeps being recorded without performing the detection of the device 200 at each time when the mobile terminal apparatus 100 moves for the prescribed distance, until a determination is made that the mobile terminal apparatus 100 stops. This enables recognition of how the device 200 moves while power consumption for the search for the device 200 is reduced in a case where the mobile terminal apparatus 100 keeps moving together with the device 200 without stopping.

In the above, application examples of this disclosure are described based on the embodiments. However, this disclosure is not limited to the contents that are disclosed in the above-described embodiments. For example, the acceleration sensor 125 is described as an example of a sensor that is used for the movement amount calculation unit 12 in the embodiments. However, a moving speed of the mobile terminal apparatus 100 is obtained by using a gyro sensor in addition to the acceleration sensor 125, and the movement amount may thereby be calculated based on the moving speed. Alternatively, in a case where the mobile terminal apparatus 100 has a function of a pedometer that measures the number of steps, the movement amount of the mobile terminal apparatus 100 may be calculated based on the number of steps of the person who has the mobile terminal apparatus 100. In addition, the position information of the mobile terminal apparatus 100 is obtained by using the GPS device 140, and the movement amount of the mobile terminal apparatus 100 may be calculated based on the obtained position information.

Further, a mode that uses an RFID technology is described as a method of searching for the device 200 in the embodiments. However, alternatively, a radio communication device that conforms to Wi-Fi® standards is used, and the search for the device 200 may thereby be performed by using a procedure that is referred to as active scan. In this case, a Wi-Fi access point is arranged in the device 200, and an electric wave signal for the search is transmitted from the mobile terminal apparatus 100 that has a communication function that conforms to Wi-Fi. The access point that receives the electric wave signal sends a response signal to the mobile terminal apparatus 100, and the mobile terminal apparatus 100 may thereby detect the presence of the device 200 that has the access point. Further, a procedure of Wi-Fi that is referred to as passive scan may be used in the method that is described as the modification example of the first embodiment and in which the device 200 transmits the electromagnetic wave and the mobile terminal apparatus 100 thereby detects the presence of the device 200. In this case, the mobile terminal apparatus 100 receives a beacon frame that is transmitted by the access point and may thereby detect the device 200 that has the access point.

As a method of searching for the device 200, alternatively, a radio communication device that conforms to Bluetooth® standards is used, and the search for the device 200 may thereby be performed by using a procedure that is referred to as inquiry. In this case, a slave-side device is arranged in the device 200, and an electric wave signal (command) for the search is transmitted from the mobile terminal apparatus 100 that has a master-side device. The slave-side device that receives the electric wave signal sends a response signal to the mobile terminal apparatus 100, and the mobile terminal apparatus 100 may thereby detect the presence of the device 200 that has the slave-side device. Further, a procedure that is provided by Bluetooth may be used in the method in which the device 200 transmits the electromagnetic wave and the mobile terminal apparatus 100 thereby detects the device 200. In this case, the mobile terminal apparatus 100 receives an advertising packet that is transmitted by the slave-side device and may thereby detect the device 200 that has the slave-side device. Further alternatively, the search for the device 200 may be performed by application of a technology that uses a non-contact type IC card or the like that conforms to near field communication (NFC) standards.

Further, a mode that uses a GPS technology is described in the embodiments as a method of obtaining the position information of the mobile terminal apparatus 100. However, a technology of Wi-Fi or Bluetooth may be used alternatively. For example, position information is added to the Wi-Fi access point that is arranged in a prescribed position, and the position of the mobile terminal apparatus 100 may be identified based on the position information of the access point that is detected by the mobile terminal apparatus 100. Similarly, position information is added to the slave-side device of Bluetooth that is arranged in a prescribed position, and the position of the mobile terminal apparatus 100 may be identified based on the position information of the slave-side device that is detected by the mobile terminal apparatus 100. Further, more accurate position information may be generated by combining the position information that is obtained by using Wi-Fi or Bluetooth with the position information that is obtained by the GPS device 140. In addition, a movement condition of the mobile terminal apparatus 100 that is obtained by the acceleration sensor 125 or the gyro sensor is detected, the movement condition is supplemented with the position information that is obtained by the GPS device 140, and more accurate position information may thereby be generated.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An apparatus comprising:
    a sensor device;
    position information obtainment circuitry; and
    a processor that is coupled to the sensor device and the position information obtainment circuitry and configured to:
        calculate a movement amount of the apparatus using information obtained by the sensor device,
        execute a search for a device on an occasion where the calculated movement amount reaches a first value,
        obtain position information that indicates a position of the apparatus using the position information obtainment circuitry when the device is detected by the search, and not obtain the position information using the position information obtainment circuitry when the device is not detected by the search, and
        record device information indicating that the device is located within a certain distance from a position specified by the position information obtained by the position information obtainment circuitry in a case where the device is detected by the search.

2. The apparatus according to claim 1, wherein the processor is configured to:
    reset the movement amount and execute calculation of the movement amount in a case where the movement amount reaches the first value,
    execute the search at each time when the movement amount reaches the first value, and
    record the device information and the position information in a case where the device is successively detected in plural times of searches while not recording the device information and the position information when the device is detected only once.

3. The apparatus according to claim 2, wherein the processor is configured to stop the search in a case where the device is not detected in the search.

4. The apparatus according to claim 2, wherein the processor is configured to stop the search after the device is repeatedly detected in the plural times of searches and obtain and record the position information of the apparatus at each time when the movement amount reaches the first value.

5. The apparatus according to claim 3, wherein the processor is configured to start the search on an occasion where the apparatus changes from a stop state to a moving state.

6. The apparatus according to claim 4, wherein the processor is configured to start the search on an occasion where the apparatus changes from a stop state to a moving state.

7. The apparatus according to claim 1, wherein the processor is configured to obtain the position information of the apparatus on an occasion where the device is detected.

8. The apparatus according to claim 1, wherein the search for the device is executed by outputting an electromagnetic wave from the apparatus, and the processor is configured to lower an intensity of the electromagnetic wave after the device is repeatedly detected in the plural times of searches.

9. The apparatus according to claim 1, wherein the processor is configured to calculate the movement amount of the apparatus after the device is repeatedly detected in plural times of searches and execute the search for the device on an occasion where the calculated movement amount reaches a second value that is different from the first value.

10. The apparatus according to claim 1, wherein the processor is configured to notify an information processing apparatus of the position information and the device information that are recorded.

11. An information processing method using an apparatus including a sensor device and position information obtainment circuitry, the method comprising:
calculating a movement amount of the apparatus using information obtained by the sensor device;
executing a search for a device by using the apparatus on an occasion where the calculated movement amount reaches a first value;
obtaining position information that indicates a position of the apparatus using the position information obtainment circuitry when the device is detected by the search, and not obtaining the position information using the position information obtainment circuitry when the device is not detected by the search; and
recording device information indicating that the device is located at a position specified by the position information obtained by the position information obtainment circuitry in a case where the device is detected by the search.

12. An information processing system comprising:
an information processing device that manages position information of a device; and
an apparatus that includes a sensor device, position information obtainment circuitry and a processor that is coupled to the sensor device and the position information obtainment circuitry, wherein
the processor is configured to
  calculate a movement amount of the apparatus using information obtained by the sensor device,
  execute a search for the device on an occasion where the calculated movement amount reaches a first value,
  obtain position information that indicates a position of the apparatus using the position information obtainment circuitry when the device is detected by the search, and not obtain the position information using the position information obtainment circuitry when the device is not detected by the search,
  record device information indicating that the device is located at a position specified by the position information obtained by the position information obtainment circuitry in a case where the device is detected by the search, and
  notify the information processing device of the device information in a case where the device is detected by the search.

13. The apparatus according to claim 1, wherein when the apparatus executes the search for the device using a wireless signal of a first intensity, the first value is set in accordance with the first intensity of the wireless signal.

14. The apparatus according to claim 1, wherein the processor is configured to obtain the position information in response to detecting the device.

15. The apparatus according to claim 1, wherein the recorded device information associates the detected device with the position of the apparatus.

16. The apparatus according to claim 1, wherein the sensor device is an acceleration sensor.

17. The apparatus according to claim 16, wherein the position information obtainment circuitry is a Global Positioning System (GPS) device.

* * * * *